(12) United States Patent
Ewing et al.

(10) Patent No.: US 7,360,071 B2
(45) Date of Patent: Apr. 15, 2008

(54) METHOD TO ESTABLISH CONTEXTS FOR USE DURING AUTOMATED PRODUCT CONFIGURATION

(75) Inventors: Douglas C. Ewing, Cedar Park, TX (US); Michael J. O'Rourke, Troutdale, OR (US); Anand Raghavan, Austin, TX (US); James M. Vinson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/116,623

(22) Filed: Apr. 28, 2005

(65) Prior Publication Data

US 2006/0248323 A1 Nov. 2, 2006

(51) Int. Cl.
*G06F 9/00* (2006.01)
(52) U.S. Cl. .............................................. 713/1
(58) Field of Classification Search .................. 713/1, 713/2; 715/961, 962
See application file for complete search history.

(56) References Cited

U.S. PATENT DOCUMENTS

| 5,877,966 | A * | 3/1999 | Morris et al. ............... 716/4 |
| 7,007,245 | B2 * | 2/2006 | D'Souza et al. ............ 715/853 |
| 7,043,047 | B1 * | 5/2006 | Masaki ....................... 382/100 |
| 7,072,728 | B2 * | 7/2006 | Montano et al. .............. 700/97 |
| 2003/0069737 | A1 | 4/2003 | Koubenski et al. |

OTHER PUBLICATIONS

McDermott, John. "Domain Knowledge and the Design Process". 18th Design Automation Conference. 1981.*
Barker, Virginia and Dennis O'Connor. "Expert Systems for Configuration at Digital: XCON and Beyond". Communications of the ACM. Mar. 1989.*

* cited by examiner

*Primary Examiner*—Chun Cao
(74) *Attorney, Agent, or Firm*—Patterson & Sheridan, LLP

(57) ABSTRACT

A method and apparatus for validating a user configuration of a computer system are provided. The method generally includes receiving, through a user interface of a configuration system, a user configuration selection, wherein the user configuration selection modifies the configuration of the computer system. Based on the user configuration selection, one or more contexts in a collection of contexts may be modified. The collection of contexts may be applied to part information for a part of the computer system to determine applicable part information for the modified configuration.

7 Claims, 17 Drawing Sheets

FIG. 7

METHOD TO ESTABLISH CONTEXTS FOR USE DURING AUTOMATED PRODUCT CONFIGURATION

CROSS-REFERENCE TO RELATED APPLICATIONS

This application is related to commonly-owned U.S. patent application entitled "Method For Representing Connections for Validation During an Automated Configuration of a Product", Ser. No. 11/116,588 filed herewith, which is herein incorporated by reference.

BACKGROUND OF THE INVENTION

1. Field of the Invention

The present invention generally relates to a method, apparatus, and computer-readable medium for configuring a computer system with a software configuration tool.

2. Description of the Related Art

Providers of high-end computer systems typically use a highly complex configuration system to configure a computer system to a customer's specifications. The configuration system includes a user interface that provides access to products data. Through the user interface, an operator selects a base system (e.g., a server model) and is then presented with configurable options which may be selected to be added to the selected base system. For a given set of operator selections, the configuration system determines whether the selections define a valid configured system. That is, the configuration system determines whether the operator selections are compatible and complete. If so, the configuration process is complete and, in some cases, additional steps such as, configuration validation, availability check, and the like are performed before the configured system is put into the order processing system. Examples of computer system configuration and validation are provided in U.S. Pat. No. 5,515,524, entitled "Method and Apparatus for Configuring Systems", which is hereby incorporated by reference in its entirety.

Conventional configuration systems for computer systems are highly complex. A computer system output by a configuration system represents a valid state the determination of which depends upon a set of applicable part rules and part data. For each part within a user-selected configuration, a different set of possible part rules and part data may be provided for use in validating the selected configuration. From the set of possible part rules and part data, only certain part rules and part data may actually be applicable for validating the selected configuration.

For example, a user-selected configuration for a computer system may contain a server software selection. The server software may interact with other software on the computer system, such as operating system software selected by the user. Accordingly, the server software may have several possible rules which are used to determine whether the selected server software is compatible with different operating systems (which may also be selected by the user). Which of the possible rules for the server software actually apply may depend on what operating system the user actually selects. However, whether such rules apply may also be dependent upon the presence of other parts within the computer system, such as a specific network communication device. Many parts which a user selects for a given configuration may have many such dependencies on other parts within the configuration.

Because of the large number of possible configurations, determining which part rules and part data apply may be a difficult task. Present configuration systems deal with the task of determining applicable part rules and part data by either providing a limited number of predefined configurations, or by enumerating tests for each part (e.g., custom code for each part) which determine what part data and what part rules apply. In a configuration system where a limited number of predefined configurations is provided, the possible part data and part rules for each predefined configuration may be established and validated when the configuration is defined (e.g., by the configuration system developer). While each predefined configuration may be valid, the user only has the predefined configurations to choose from, and thus has limited choices. In a configuration system where part rules and part data are determined by part-specific, specially programmed tests for each possible configuration of the computer system, new configurations (composed, for instance, of newly manufactured parts) may not be accommodated by the specially programmed tests. Accordingly, current methods for validating the configuration of a computer system are inflexible, difficult to modify, and offer the user a limited number of configuration options.

Therefore, there is a need for improved methods for validating a user configuration of a computer system.

SUMMARY OF THE INVENTION

The present invention generally provides a method, system, and computer-readable medium for validating a user configuration of a computer system being configured with a configuration system. The method performed generally includes receiving, through a user interface of the configuration system, a user configuration selection, wherein the user configuration selection modifies the configuration of the computer system and based on the user configuration selection, modifying one or more contexts in a collection of contexts, wherein each modified context represents a condition of the configuration of the computer system which is related to the user selection. The method further includes applying the collection of contexts to part information for a part of the computer system to determine applicable part information for the modified configuration, wherein the part information comprises at least one of part data and part rules, wherein the part rules comprises one or more rules defining tests for determining the validity of the configuration and wherein the part data defines one or more necessary components for operation of the part.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is a user interface screen illustrating a modified products list, according to one embodiment of the present invention.

DETAILED DESCRIPTION OF THE PREFERRED EMBODIMENTS

Figure 1:
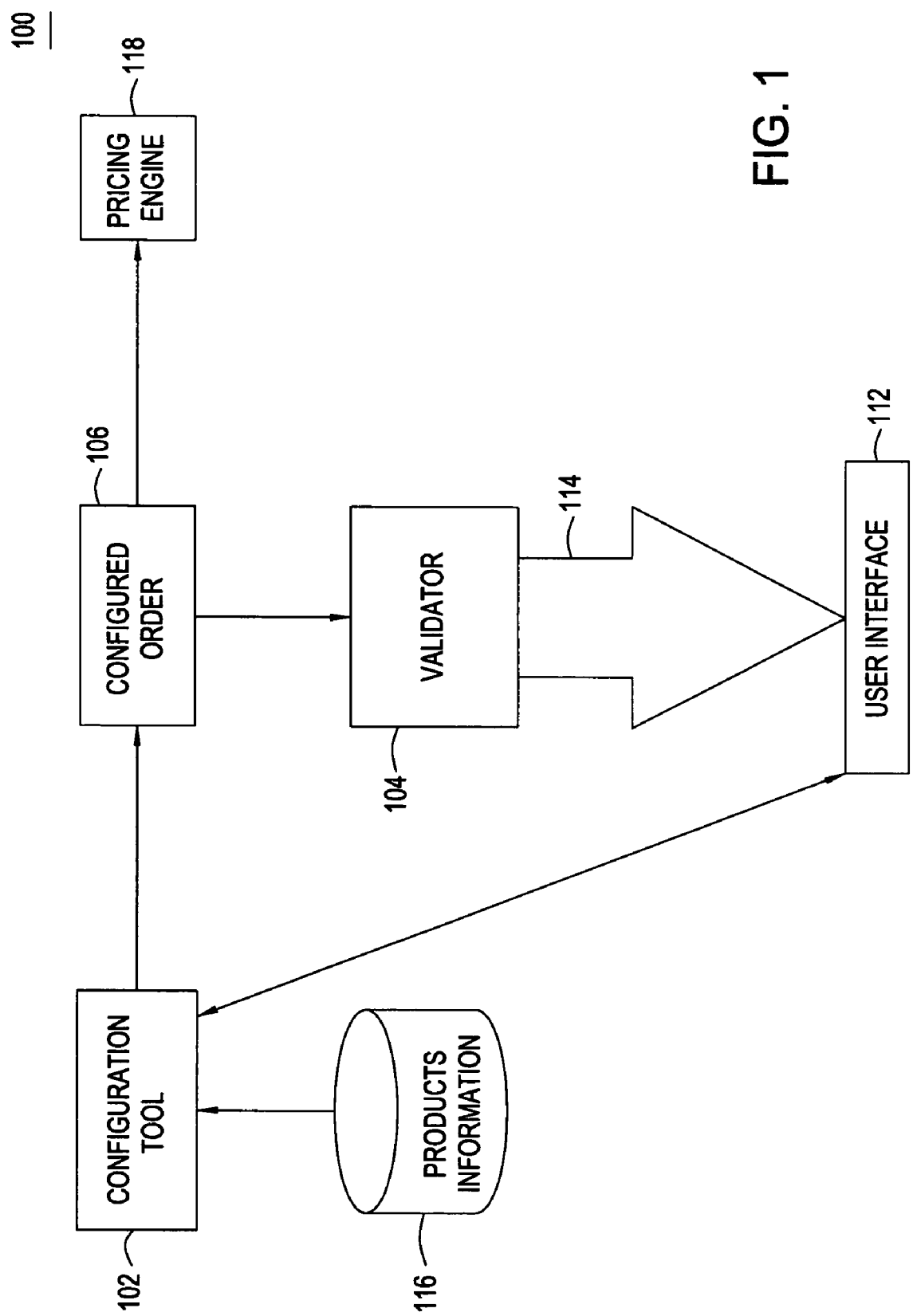
FIG. 1 is a high-level diagram of a configuration system in which aspects of the present invention may be implemented.

Embodiments of the present invention generally provide a method for validating a user configuration of a computer system being configured with a configuration system. The method performed generally includes receiving, through a user interface of the configuration system, a user configuration selection, wherein the user configuration selection modifies the configuration of the computer system. Based on the user configuration selection, one or more contexts in a collection of contexts may be modified. Each modified context represents a condition of the configuration of the computer system which is related to the user selection. The collection of contexts may be applied to part information for a part of the computer system to determine applicable part information for the modified configuration. The part information includes at least one of part data and part rules. The part rules may include one or more rules defining tests for determining the validity of the configuration. The part data may define one or more necessary components for operation of the part. Once the applicable part information is determined, the applicable part information may be used to validate the configuration.

For purposes of illustration, aspects of the invention described herein are specifically directed to configurators used in configuring computer systems. Such computer systems may include low end personal computers, servers, clustered systems, computer networks or any other system of computers. However, it is understood that the invention includes, extends to, encompasses, and/or applies to any other system being configured. For example, the configurator may be a configurator used to configure a telecommunications system, a mechanical system (e.g., an automobile), or any other type of system. Persons skilled in the art will recognize other environments which may benefit from aspects of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Configuration System Overview

Referring now to FIG. 1, a configuration system 100 is shown. Generally, the system 100 includes a system configuration tool 102 and a validator 104. As shown in FIG. 1, the system 100 is not intended to suggest or necessitate any particular architecture. Thus, it is contemplated that the configuration tool 102 and the validator 104 reside on the same system, or on separate systems. Further, although shown as singular entities, in practice the configuration tool 102 and the validator 104 may be implemented as a plurality of software and/or hardware components collectively configured to perform various functions, including those described herein. Thus, in one embodiment, the configuration tool 102 may run on a desktop. In another embodiment, the configuration tool 102 may run as a web application.

In one embodiment of the present invention, the configuration tool 102 provides a user access to available product selections from products information source 116. The available selections are displayed, and selected from, a user interface 112. In addition to data representing the available selections from which a user may choose, the products information source 116 may also include the necessary logic for these data to interact with each other and respond to different user selections. Once a configuration has been chosen using the configuration tool 102, the validator 104 may process the selections and determine whether the products chosen are compatible and complete to be a valid order, by running them through a validation logic/process.

In operation, the configuration tool 102 presents the available product selections to a user who then makes desired selections via the user interface 112. The result of each user selection is a configured order 106, produced by the configuration tool 102. Thus, the configuration tool 102 may iteratively output a configured order 106 in response to each user selection of a product. The configured order 106 represents a state of the configured system during the user selection process and contains a list of products selected and used in the configuration of the current system. Any given configured order, however, may not be valid.

At least in one embodiment, validation is performed in response to an explicit user command input via the user interface 112. In response to the validation request, the validator 104 determines, for the given set of user selections, whether the selections are compatible and result in a valid configured system. Upon successfully validating the configuration, the final configured system is in a single valid state. That is, all the necessary parts (i.e., hardware, software, services, etc) have been automatically generated and validated. The validator 104 may provide feedback 114 to the user interface 112 depending upon the success of the validation process. If the configured system is invalid, an error message may be shown to the user. The error message may, for instance, explain why the selected configuration is invalid or suggest alternative choices which may be valid. If the validation is successful, the feedback 114 may inform the user that the selected configuration is valid.

The configuration tool 102 may also be configured to determine availability of additional compatible products by examining the configured order 106 and a cross-sell information source. In one embodiment, the cross-sell information source contains cross-sell products that may be offered to customers who have configured a system, or are currently configuring a system, using the configuration tool 102.

At any time during configuration of a system (whether validated or not), a user may determine the price of selected components and the configured system by invoking a pricing engine 118. The pricing engine 118 includes pricing files that contain pricing data for corresponding products in the products information source 116. Once an order is configured (although not necessarily validated), the selected products list contained in the configured order 106 is received by the pricing engine. The pricing engine then, accesses the price data for the products in the order and calculates the final price.

Exemplary Configuration Process

As noted above, user interaction with the system 100 is facilitated by the interface 112. In one embodiment, the interface 112 is a graphical user interface (GUI) comprising a number of screens that enable the user to configure a system. The user steps taken with respect to the interface 112 during a configuration process may include, but are not limited to, making selections from a list of available products and services and configuring and validating the system based on the selections made. Following is an illustration of such steps with respect to representative screens of the interface 112.

Figure 2:
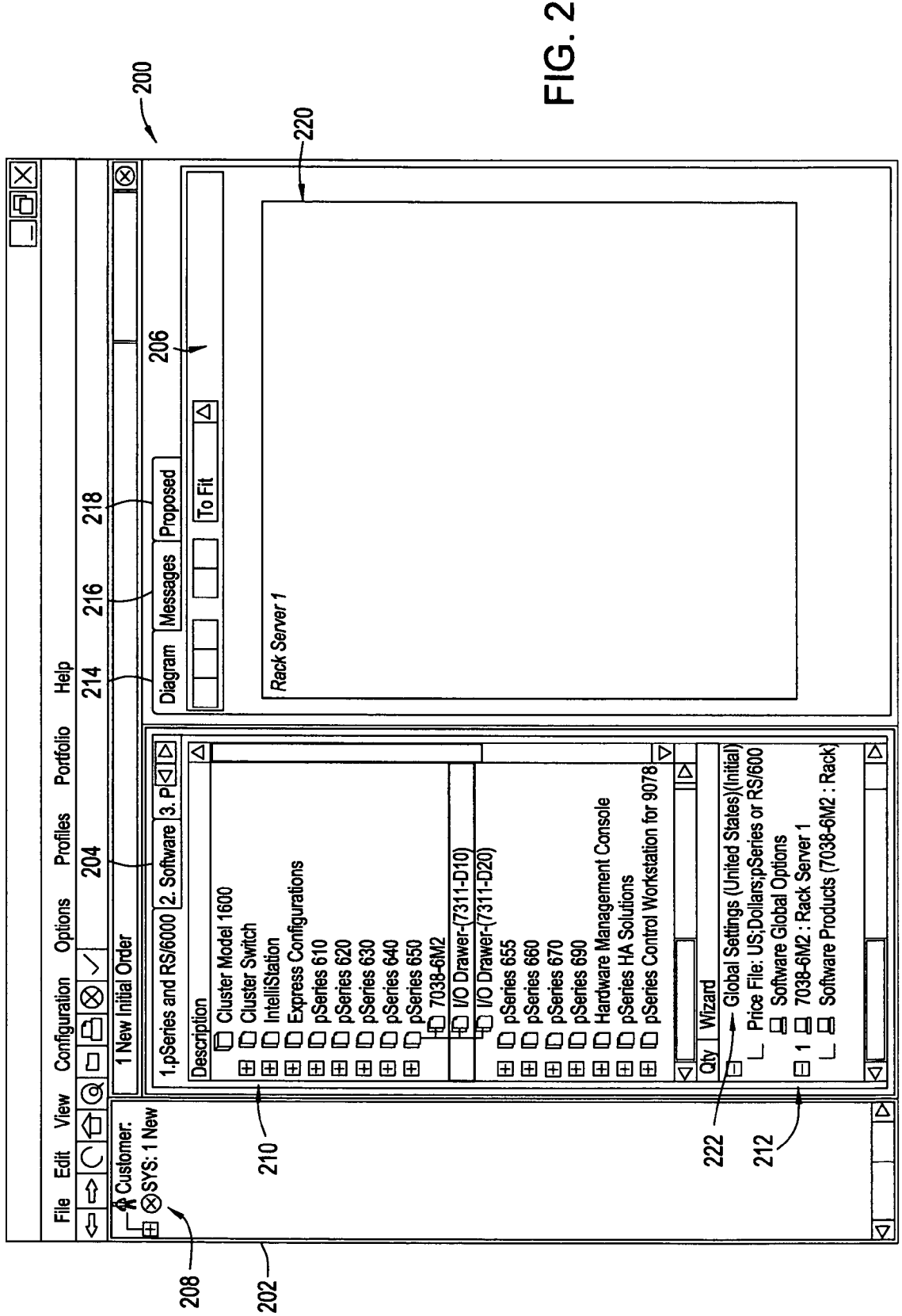
FIG. 2 is a user interface screen illustrating generic configuration tool capabilities, according to one embodiment of the present invention.

FIGS. 2-9 show exemplary user interface screens that may be utilized in selecting products for and configuring a system according to one embodiment of the present invention. For example, FIG. 2 illustrates an exemplary GUI screen 200 through which a user can select configurable products for a previously chosen base system. The GUI screen 200 illustratively includes three frames. A first frame 202 presents a list of base systems a customer has ordered, showing whether or not those systems are in a valid state. For example, a red cross 208, signals that the base system, SYS:1New, has not yet been validated. A second frame 204 is divided between two sections. A top section 210 includes various tabs that represent the different kinds of components available for the base system 208. By clicking on each of these tabs, the user may be presented with a comprehensive list of products available. A bottom section 212 shows a list of products that have already been selected. For example, the frame 212 shows that a rack server 7038-6M2 has previously been selected by the customer. Additionally, the bottom section 212 contains a Global Settings object 222. The object 222 represents the geographic context in which a system is being configured. For example, as illustrated, the Global Settings object 222 is set to the "United States", since the product is being configured and sold in the United States. If the system were being configured in a Japan, for example, the object 222 would be set to Japan. For a given geographic context, the Global Settings object represents the available products, cross-sell products, and/or pricing files that are being used in the current configuration session.

In addition to the functionalities provided by the frame 204 (in the top and bottom sections 210 and 212), a third frame 206 on the right offers three additional tabs. Selection of a diagram tab 214 may show customer orders in a diagram pane 220. The diagram pane 220 shows a top-level graphical representation of the ordered system. The details of the underlying structure of the ordered system, however, may be omitted from the diagram pane 220. Selection of a proposed tab 218 may present a list of products selected and their corresponding cost in a textual format. Additionally, selection of a messages tab 216 may provide a list of messages the provider wishes to convey to the customer.

Figure 3:
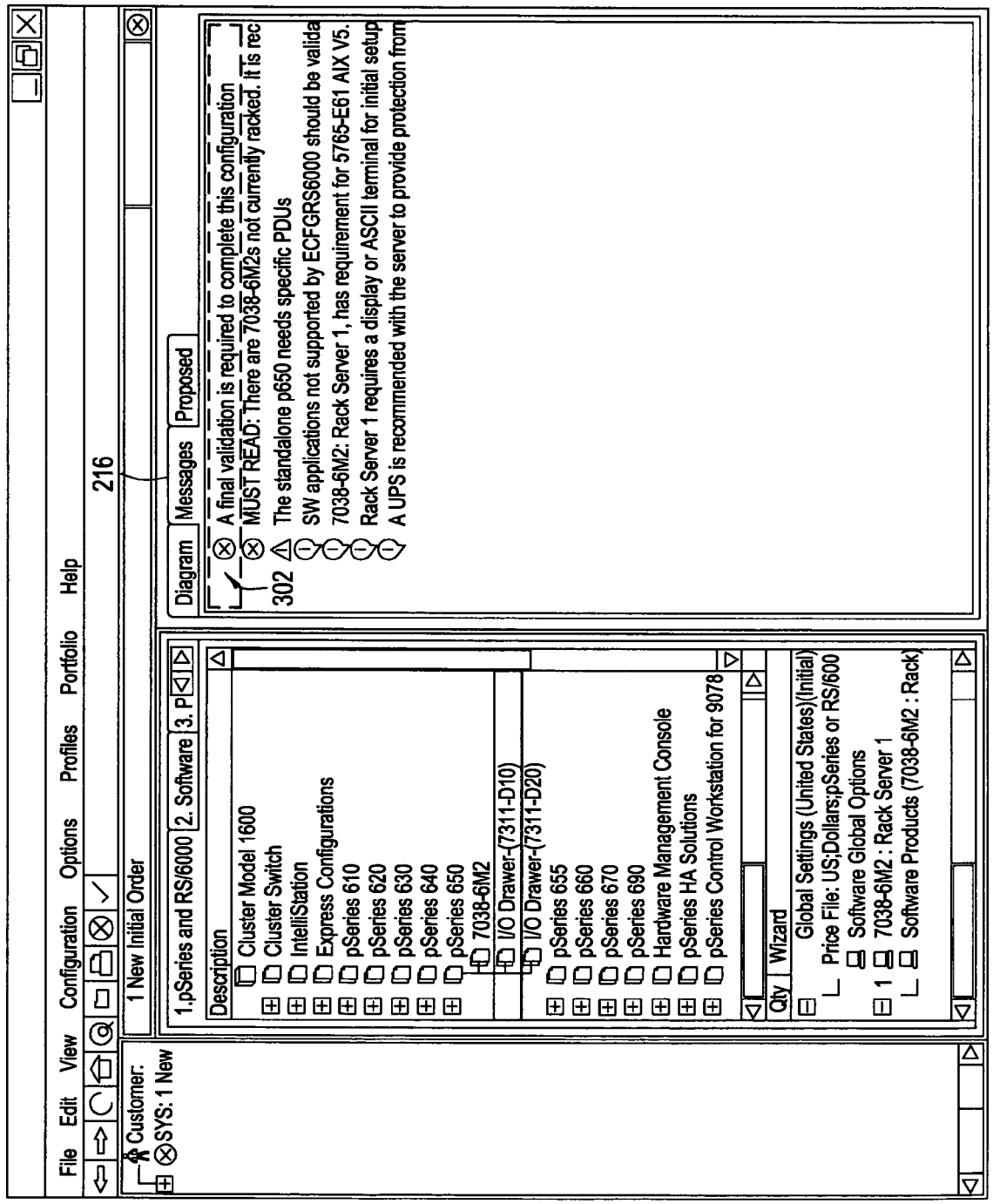
FIG. 3 is a user interface screen illustrating a messages tab in a generic configuration tool user interface screen, according to one embodiment of the present invention.
Figure 4:
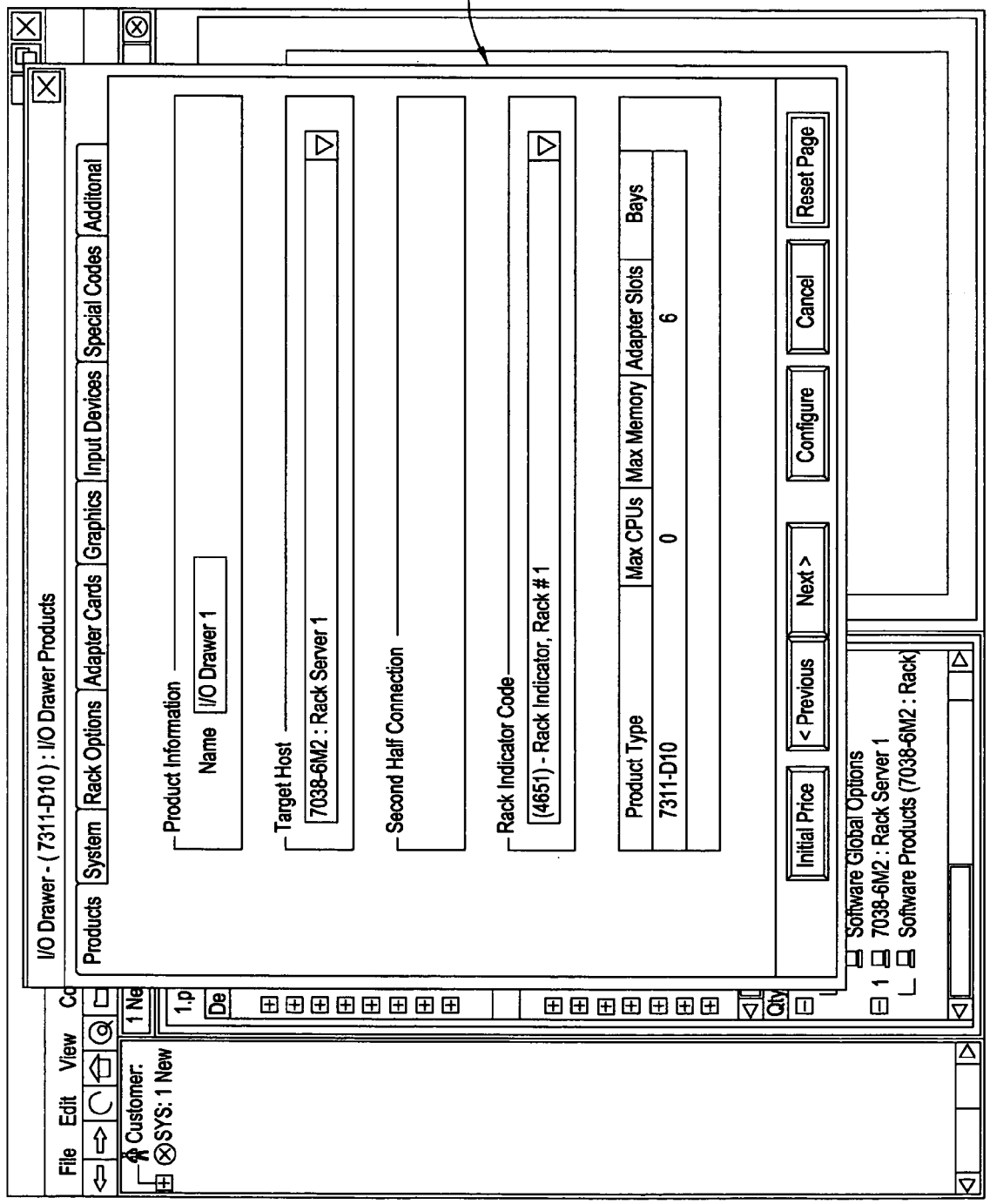
FIG. 4 is a user interface screen illustrating selection and configuration of a product, according to one embodiment of the present invention.

FIG. 3 illustrates representative messages that may be displayed to the user when the messages tab 216 is selected. For example, the messages include a warning 302: "A final validation is required to complete this configuration."

Figure 5:
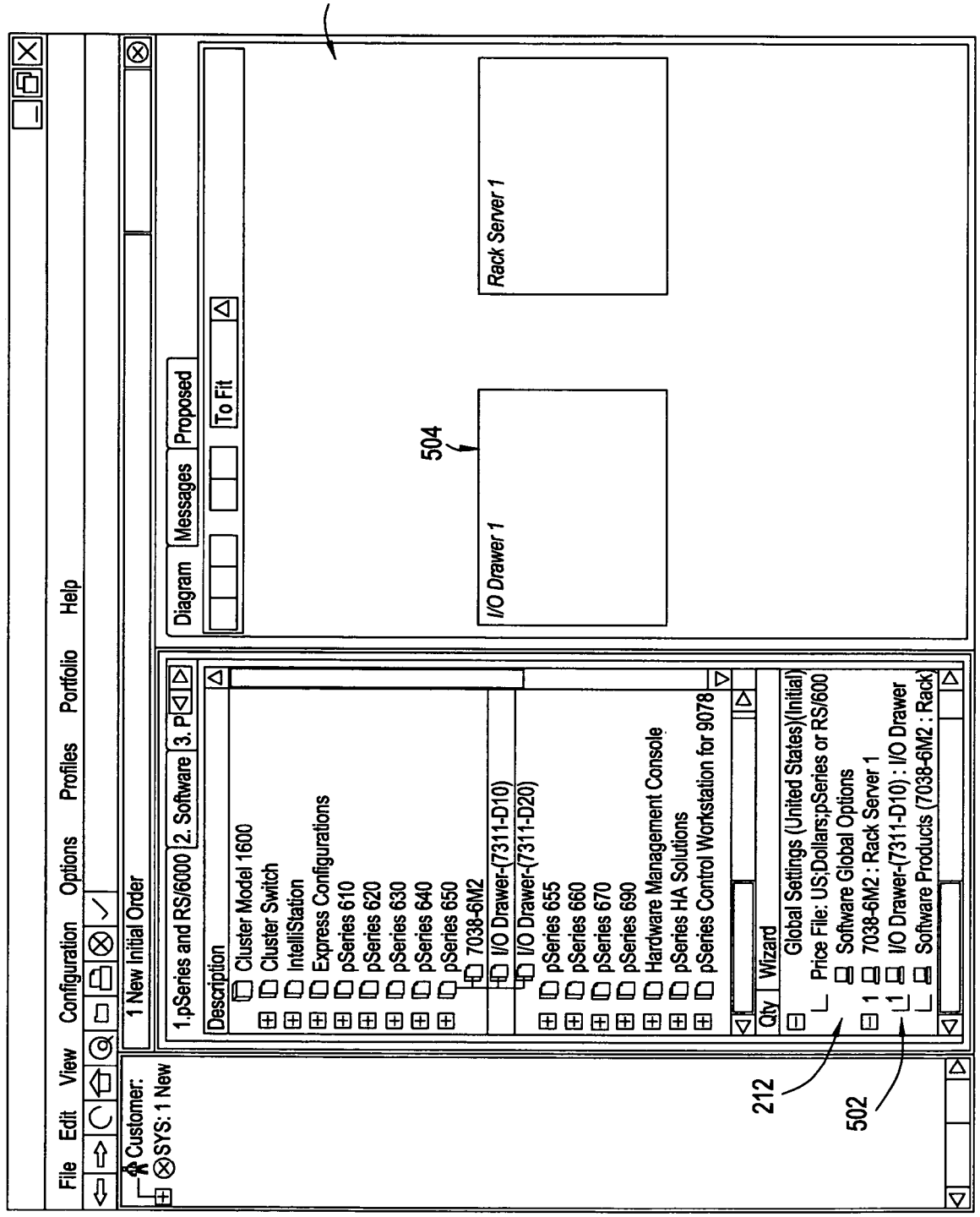
FIG. 5 is a user interface screen illustrating a diagram tab in a generic configuration tool user interface screen, according to one embodiment of the present invention.

Selecting an additional product from the top section 210 may invoke a corresponding wizard that assists in customizing and configuring an available product. For example, by selecting "I/O Drawer-[7311-D10]" from the "pSeries and RS/6000" tab, a wizard such as the one illustrated in FIG. 4 may be invoked. As shown in an exemplary GUI 400, the user may utilize the wizard to customize the order, configure the system, or cancel the request. FIG. 5 illustrates that after the product has been selected and customized through the wizard, a product object 502 ("I/O Drawer") is added to the products list in the frame 212. Additionally a graphical element 504 representing the "I/O Drawer" has been added to the diagram pane 220.

Figure 6:
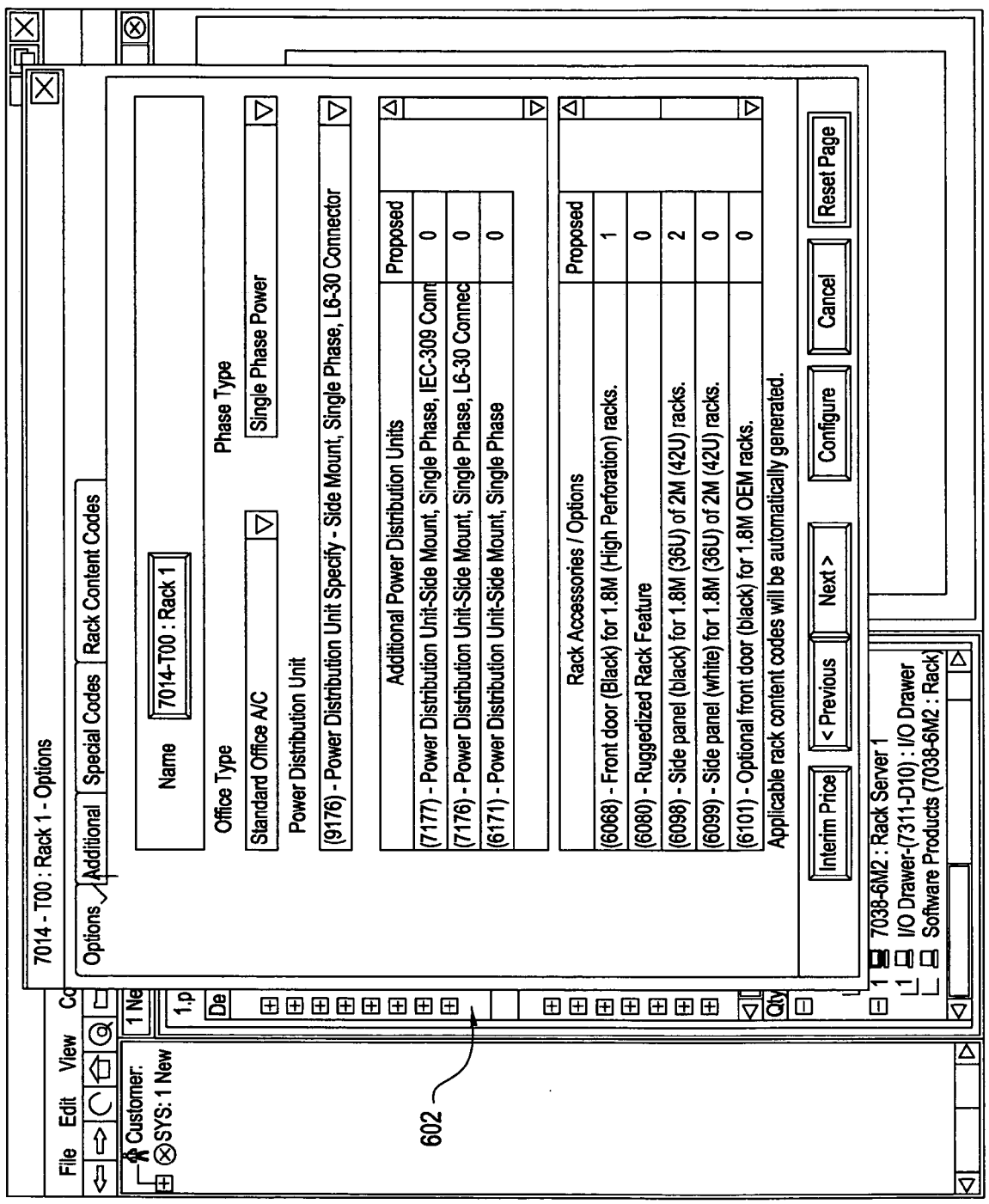
FIG. 6 is a user interface screen illustrating a configuration wizard for a product, according to one embodiment of the present invention.
Figure 7:
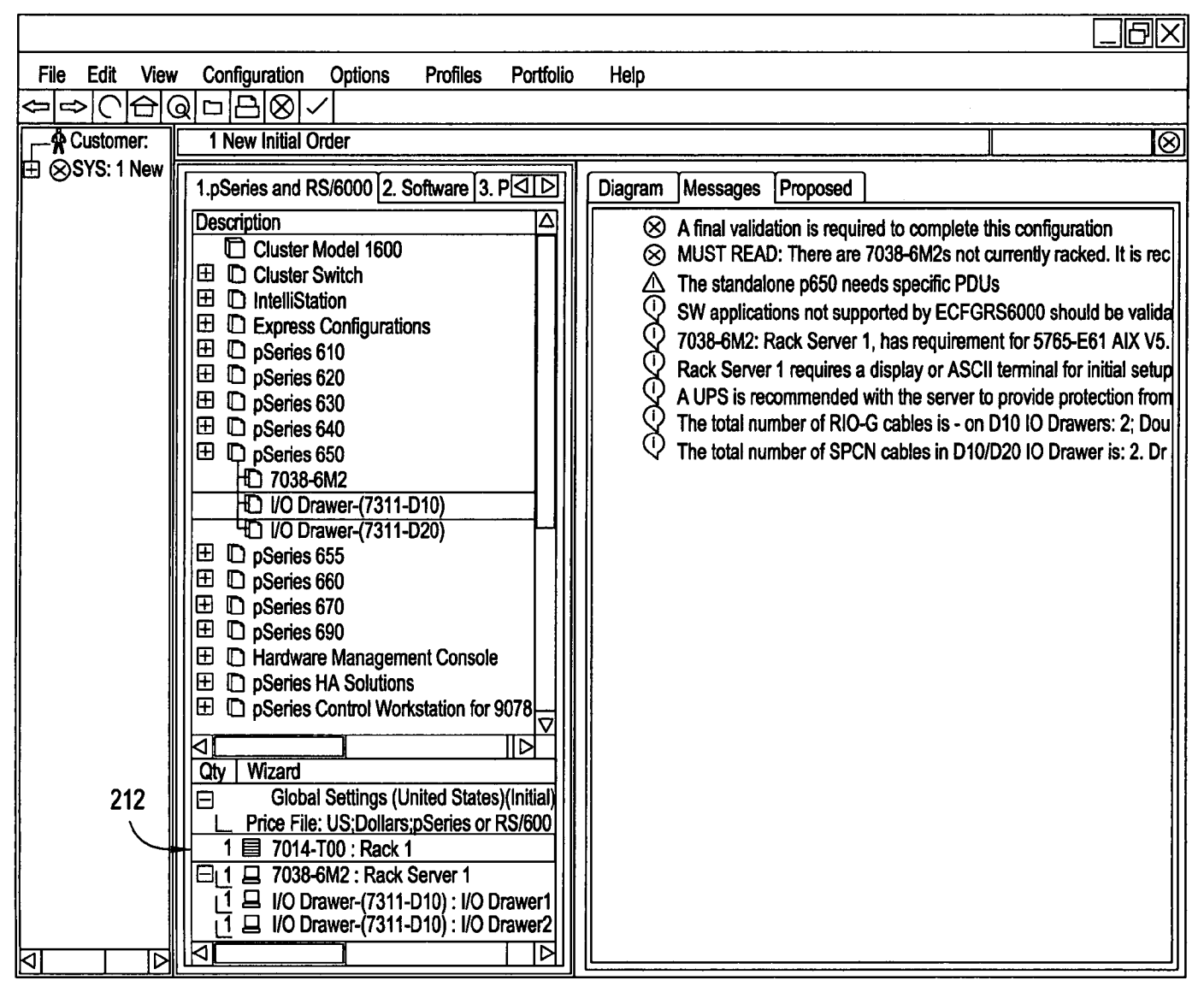

FIG. 6 is one embodiment of a user interface screen illustrating another configuration wizard for a product, according to one embodiment of the present invention. After a user has selected a new product, for instance a "7014-T00 Rack", a wizard 602 (e.g., a 7014-T00 Wizard) may be launched. The user may customize the new selected product and reconfigure the system through the wizard 602, as shown in FIG. 6. FIG. 7 shows that the new product "7014-T00" has been added to the product's list in the frame 212.

Figure 8:
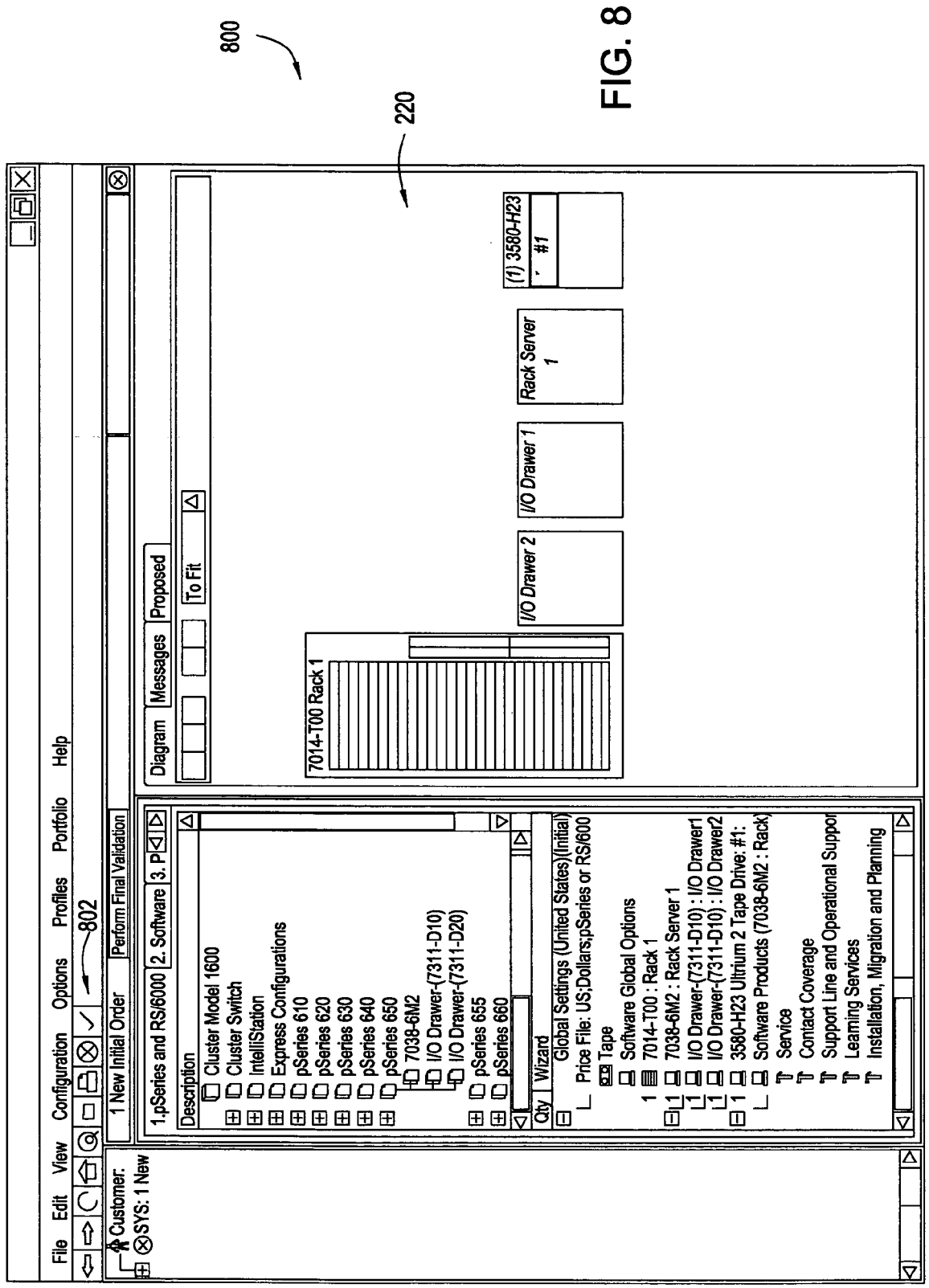
FIG. 8 is a user interface screen illustrating a diagram pane showing the additional selected products, according to one embodiment of the present invention.
Figure 9:
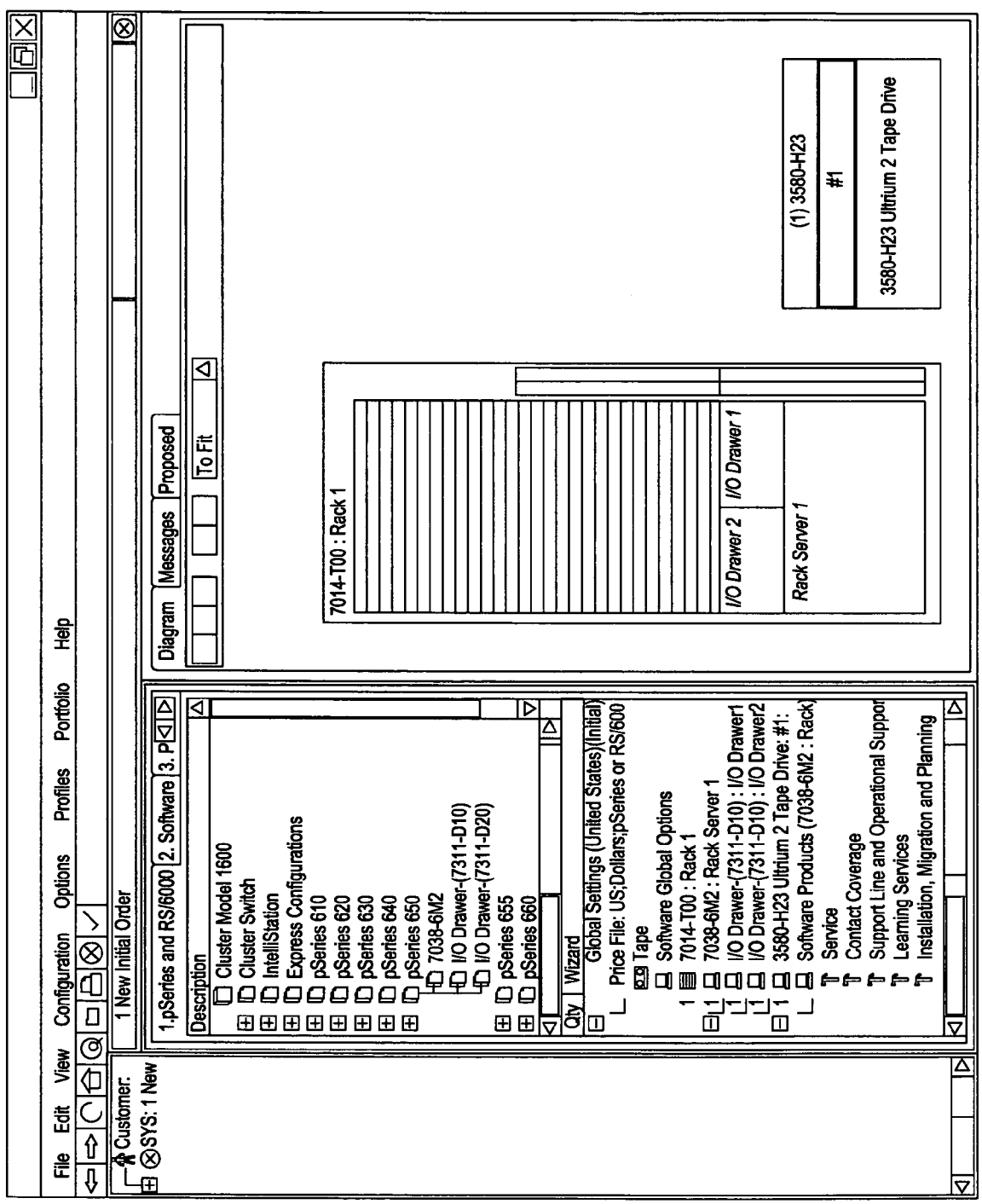
FIG. 9 is a user interface screen illustrating a diagram pane showing the final configured system, according to one embodiment of the present invention.

FIG. 8 illustrates the diagram pane 220, after the customer has selected and configured additional products for the system. As shown, a button 802 (marked by a checkmark) is provided for performing the final validation for the system. By clicking on the button 802 a final configuration for the system may be performed (described below). FIG. 9 is an exemplary GUI 900 illustrating the final configured system. As illustrated, the different components are now organized and stacked to represent a final valid state.

While the GUI screens described herein provide one or more embodiments of the present invention, persons skilled in the art will recognize that the information presented herein can be presented in a variety of other ways while still providing the same or similar results.

Modifying Contexts Based on User Selections Configuration

Embodiments of the present invention generally provide a method, apparatus, and computer-readable medium for validating a user configuration of a computer system being configured with a configuration system.

According to one embodiment of the invention, when a user configuration selection is received through the user interface 112, one or more contexts in a collection of contexts may be modified. Modifying one or more contexts may include adding a context to the collection of contexts or removing a context from the collection of contexts. When the configuration is being validated, the collection of contexts may be applied to part information for a part of the computer system to determine applicable part information for the modified configuration. The part information may then be used to validate the user-selected configuration.

A context within the collection of contexts represents a condition or a state of the configuration of the computer system which is related to one or more user selections. A context may represent a user selection or an aspect of a user selection. In one embodiment, the user selection or aspect of the user selection may be described using a string or enumerated value. A context may also represent an implicit aspect of a user selection. An implicit aspect of a user selection is something which the user does not explicitly request, but which is implicitly included in the request. The implicit aspect of the user's selection may also be described using a string or enumerated value, in one embodiment of the invention.

As an example, consider a user who makes a selection which adds server software, e.g., IBM HTTP Server V6.0.0.0, to a configuration. As a result of this selection, one or more contexts may be added to the collection of contexts. One added context may represent the selection directly. The context which represents the selection directly may be a string which directly describes the exact selection made by the user, e.g., "IBM HTTP Server V6.0.0.0". Another added context may represent an aspect of the selection. For example, an added context may represent the version number of the server software, e.g., "V6.0.0.0". The context which represents the aspect of the selection may describe the version of the selected server. Yet another context may represent an implicit aspect of the selection. For example, the context which represents an implicit aspect of the selection may describe a driver used by the server. The driver is implicit in the user's selection because the driver is not explicitly requested by the user, but is required for operation of the user's selected server.

The collection of contexts represents all of the selections and conditions (including user selections and default selections) for the entire computer system configuration. In other words, the collection of contexts represents the overall set of circumstances in which part rules and part data may be used. Thus, there may be a one-to-one relationship between the collection of contexts and any given computer system configuration. When applying the collection of contexts to the set of possible part rules and part data, the collection of contexts (e.g. which enumerated values or strings are grouped together) may determine which possible part rules or part data apply.

For instance, a certain part rule for validating a firewall software component may only apply when the collection of contexts contains a context which indicates that a specific version of server software has been selected (e.g., "version 5.4.2"). If version 5.4.2 of the server software has been selected by the user, that version number may be placed in the collection of contexts as, e.g., a string or enumerated value. During validation, when determining whether to apply the part rule, the collection of contexts may be examined. When the context (e.g., the enumerated value or string) describing that version 5.4.2 of the software has been selected is found in the collection of contexts, the rule may then be determined to be applicable and may accordingly be applied to validate the configuration of the system. In validating the configuration of the system, the rule may be used to determine, for instance, if the server software is compatible with the firewall software.

In one embodiment of the invention, the collection of contexts may be implemented as a scope object. Thus, for each system configuration, a single scope object may be instantiated. The contexts in the collection of contexts may be contained within the scope object as a list. In one embodiment, each context within the list may be implemented as an enumerated value or a string. According to another embodiment, each context may be implemented as an object. As described below, the contexts in the collection of contexts may also be hierarchical contexts.

Any number of contexts related to the configuration of the computer system may be placed in the scope object, and the contexts may be of any type. Thus, the scope object may be thought of as an open-ended container for contexts. For instance, the contexts in the scope object may be conditions which relate to any of the different software parts (e.g., a server software type) or hardware parts (e.g., a SCSI hard disk type) within the computer system being configured. Because the scope object may contain any type of context, the scope object may be referred to as being "type-agnostic".

The process of modifying the contexts within the scope object may not be specifically controlled by the user. In other words, the modification of contexts may be inferred from the user selections, and may accordingly be transparent to the user. Because the modification of contexts within the collection of contexts may be driven by user selections, the modifications to the collection of contexts may be performed while the user is configuring the computer system, described below with respect to FIG. 10.

Figure 10:
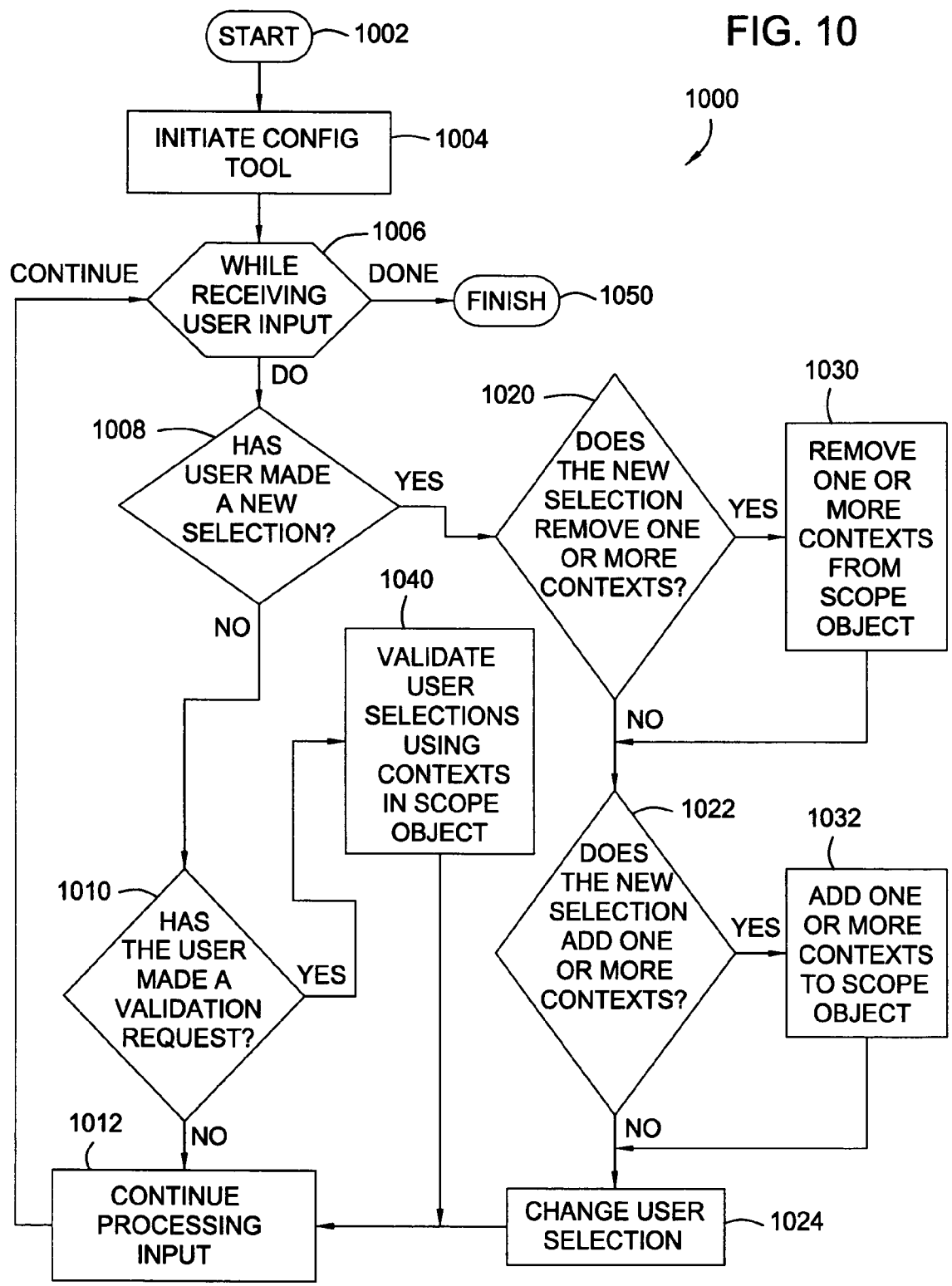
FIG. 10 depicts a process of configuring a system according to one embodiment of the present invention.

FIG. 10 depicts a process 1000 for configuring a system according to one embodiment of the present invention. In one embodiment, the process 1000 is implemented by the configuration tool 102. The process 1000 may begin at step 1002 and continue to step 1004 where the configuration tool 102 is initiated. When the configuration tool 102 is initiated, a default configuration of the computer system being configured may be provided to the user. Thus, the initial configuration may have one or more default selections.

Figure 11:
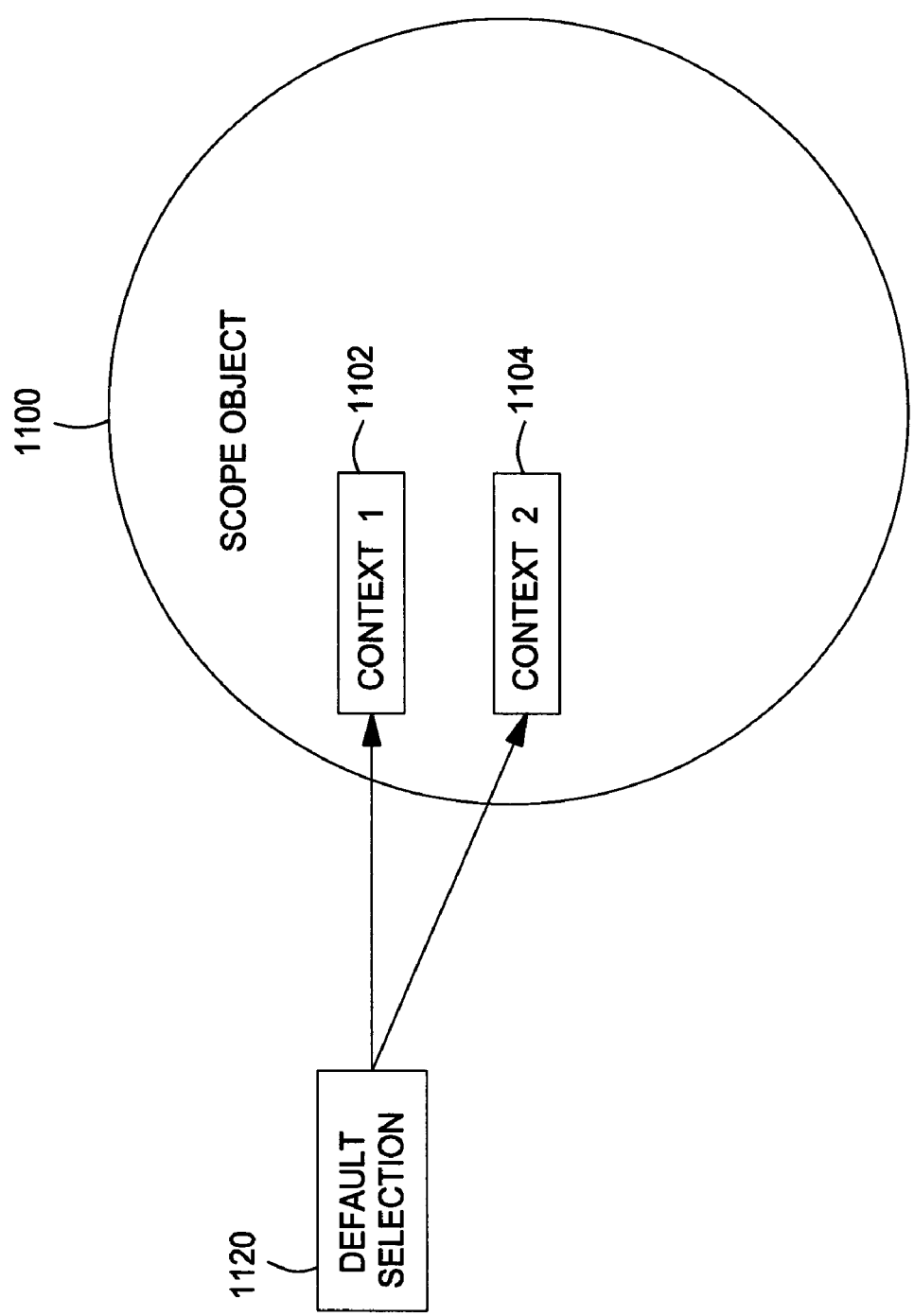
FIG. 11 is a block diagram depicting a scope object containing default contexts according to one embodiment of the present invention.

A scope object may also be created for the default configuration. Because default selections may be made for the default configuration, the scope object may contain several initial, default contexts. FIG. 11 is a block diagram depicting a scope object 1100 containing default contexts 1102, 1104 according to one embodiment of the present invention.

The default selection 1120 (or any selection described below) may be used to determine which context(s) are added to the scope object 1100. In one embodiment of the invention, the added contexts 1102, 1104 may be selected from a master list of contexts. The master list of contexts may contain every possible context which may apply in any selected configuration. In one embodiment, context selection rules, depicted in Table 1, may be used to determine whether a selection maps to a given context or contexts in the scope object 1100. Each of the context selection rules are described below with reference to FIGS. 11-13.

TABLE 1

Context Selection Rules

| Selection | Context Selection Rule |
|---|---|
| 1. Default Selection | Context 1 and Context 2 |
| 2. User Selection 1 | Context 2 and Context 3 |
| 3. User Selection 2 | Context 3 |
| 4. User Selection 3 | (No Context Modified) |
| 5. User Selection 4 | Context 4 and Context 5 and Context 6 |

During initialization, the configuration tool 102 may use the context selection rules to determine which contexts are initially included in the scope object 1100. As illustrated, the context selection rules may describe which selections map to which contexts. Thus, as indicated by the first context selection rule, default selection 1120 ("Default Selection", for instance, a default server selection) may map to two contexts 1102, 1104 ("Context 1 and Context 2", for instance a server version and a hardware driver used by the server).

Thus, during initialization, the configuration tool may add the contexts 1102, 1104 to the scope object 1100. According to one embodiment of the invention, the contexts 1102, 1104 may be added to the scope object 1100 by inserting the contexts 1102, 1104 into a list within the scope object 1100.

After the configuration tool 102 is initiated and the scope object has been created, the process 1000 of configuring the computer system may then continue to step 1006 where a loop is entered. The loop may continue while user input is being received. At step 1008, a determination may be made of whether a user selection has been made. The user selection may be any type of selection, including a selection which modifies a part in the configuration, adds a part to the configuration, or removes a part from the configuration (i.e., deselects a part). The selection may be in regards to both software parts of the system and hardware parts of the system.

If a user selection is made at step 1008, a determination of whether the user selection removes a context may be made at step 1020. If the selection removes a context, the context may be removed from the scope object at step 1030. The determination of whether a context should be removed may be made using the context selection rules described above. For example, if a user selection removes a default server software selection (e.g., default selection 1120), the contexts which that selection maps to (e.g., contexts 1102, 1104) may also be removed from the collection of contexts contained in the scope object 1100.

After determining whether the user selection removes one or more contexts, a determination of whether the user selection adds one or more contexts may be made at step 1020. If the user selection adds a context, the context may be added to the scope object 1100 at step 1030. The determination of whether a context should be added may also be made using the context selection rules described above. For instance, if a user previously removed the default selection 1120, applying the context selection rules may remove corresponding contexts 1102, 1104 from the scope object 1100. Then, if a subsequent user selection restores the default selection, the context selection rules may be used to restore contexts 1102, 1104 to the collection of contexts in the scope object 1100.

Figure 12:
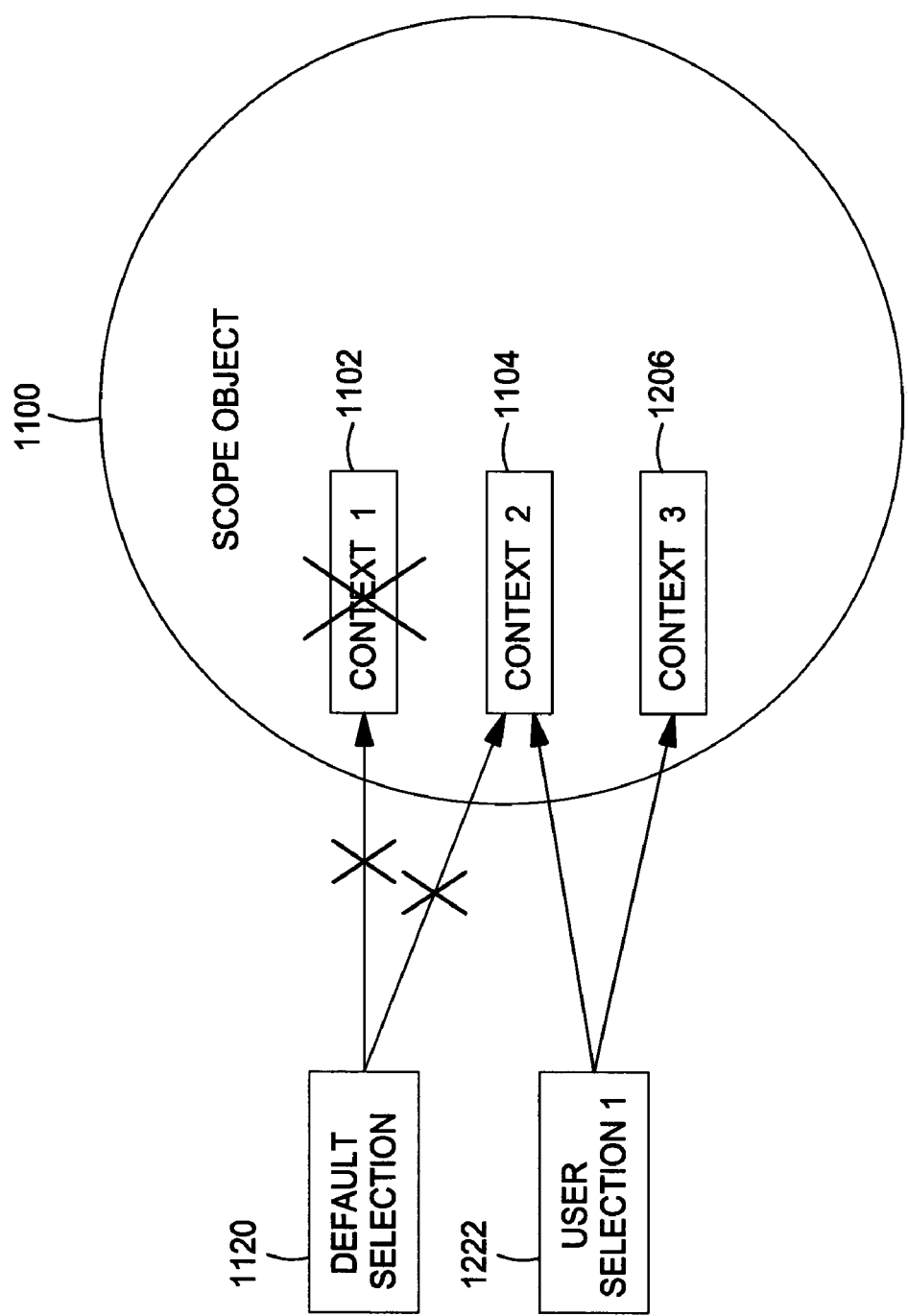
FIG. 12 is a block diagram depicting a scope object after the user has replaced a default selection according to one embodiment of the present invention.

In one embodiment of the invention, a single selection may be used to both remove contexts from the scope object 1100 and add contexts to the scope object 1100. For instance, the user may make a selection, which overrides another selection (e.g., default selection 1120). FIG. 12 is a block diagram depicting a scope object 1100 after the user has replaced the default selection 1120 with a new selection (the first user selection 1222) according to one embodiment of the present invention. One selection may replace another selection, for instance, where a pull-down menu (e.g., a drop box) is changed from one option on the menu to another option on the menu. Because the default selection 1120 has been replaced, a context 1102 which depends from the default selection may be removed. However, some contexts may be included in more than one selection. As listed in the context selection rules in Table 1, both the default selection 1120 and the first user selection 1222 map to the second context 1104. Accordingly, after replacing the default selection 1120 with the first user selection 1222, the first context 1102 may be removed but the second context 1104 may remain. Also, because the context selection rules indicate that the first user selection 1222 also maps to the third context 1206, the third context 1206 may be added to the scope object 1100.

According to one embodiment of the invention, the modification of contexts which results from a user selection may not be readily apparent in light of the selection. For instance, changing the server selection may modify a context in the collection of contexts which applies to a hardware driver used by the server software. While the user may not explicitly intend to change the context with respect to the hardware driver selection, selecting the server software may imply that the context related to the hardware driver is applicable to the configuration, and thus the context may be added to the collection of contexts.

According to one embodiment of the invention, complex context selection rules may be used to modify contexts in the collection of contexts. For instance, some contexts may be modified only in the presence of multiple user selections. As an example, a given context may only be modified in the presence of three seemingly unrelated user selections, such as a specific server software selection, disk drive selection, and operating system selection. Also, some context selection rules may force the removal of one or more contexts from the collection of contexts. As an example, a context may be used to specify that a certain part (e.g., a network connection) is not present in the system. If the user inserts such a component, the corresponding context may be removed from the collection of contexts.

Because contexts in the collection of contexts may have multiple dependencies on multiple selections, several methods may be used to determine whether or not a given context is added or removed by a user selection. In one embodiment, upon receiving a new user selection, all of the contexts in the collection of contexts may be removed. After all of the contexts have been removed, the context selection rules may be applied to each previous user selection as well as the new user selection to determine which contexts to add to the collection of contexts. In another embodiment, each context may keep a list of the user selections which map to the context. When one of the user selections that maps to the context is changed, the context may be notified of the change and determine whether or not to remove itself from the collection of contexts. Using the foregoing discussion, other methods of managing the collection of contexts should be readily apparent to one skilled in the art.

Figure 13:
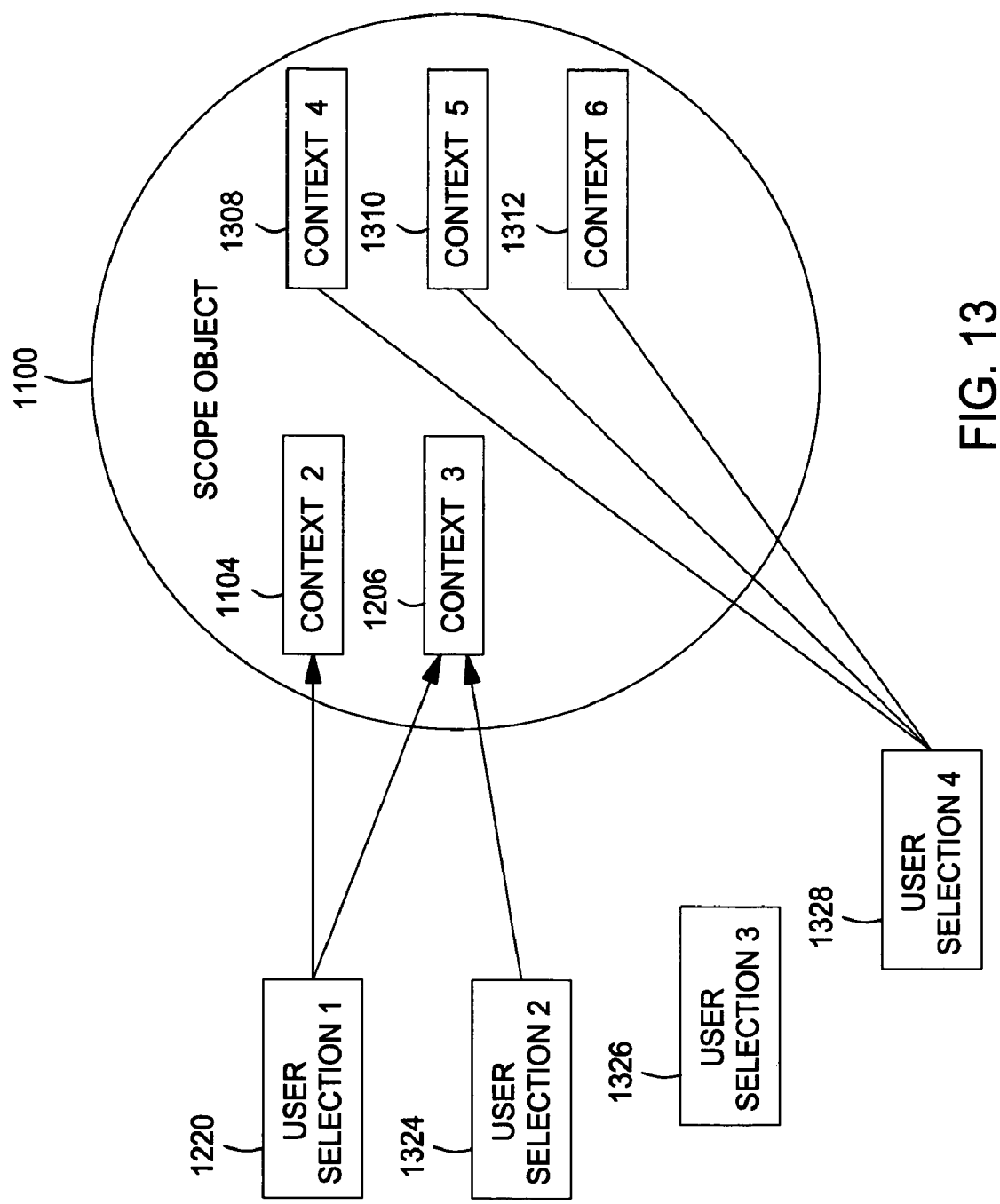
FIG. 13 is a block diagram depicting a scope object after multiple user selections according to one embodiment of the present invention.

Returning to FIG. 10, after the collection of contexts has been modified according to the user selection, the user selection may be changed at step 1024. The process 1000 may then continue processing input at step 1012. If more input is received, a determination may again be made at step 1008 of whether the input was a new user selection. If a new user selection is detected, the steps of modifying the collection of contexts described above may be repeated. After several such selections, the scope object 1100 may appear as in FIG. 13. FIG. 13 is a block diagram depicting a scope object after multiple user selections according to one embodiment of the present invention. Some user selections, such as the third user selection 1326, may not modify or map to any contexts in the collection of contexts. Other user selections, such as the fourth user selection 1328, may map to three or more contexts 1308, 1310, 1312. Again, determining how to modify the collection of contexts in the scope object 1100 according to each user selection may be accomplished using the context selection rules described in Table 1.

If a new user selection is not detected at step 1008, the process 1000 may proceed to step 1010 where a determination is made of whether the user has made a validation request. A validation request may be made, for instance, when the user clicks a button 802 to initiate the validation, when the user clicks on the validation message 302 in FIG. 3, or by choosing a validation option from a contextual menu (displayed when the user right clicks) or from a drop-down menu such as the configuration menu. If a validation request is detected, the user selections (i.e. the configuration of the computer system) may be validated using the contexts contained in the scope object 1100. In one embodiment, the validation step 1040 may be performed by the validator 104. The validation step 1040 is described below in greater detail with reference to FIGS. 14-17. Once the configuration has been validated (either successfully or unsuccessfully) at step 1040, or if no validation request is detected at step 1010, the process 1000 may continue processing input at step 1012. When the process is done receiving input at step 1006 (for instance, when the user decides to order the configured system or exit the configuration tool 102 without ordering), the process 1000 may finish at step 1050.

Validating the User-selected Configuration

Figure 14:
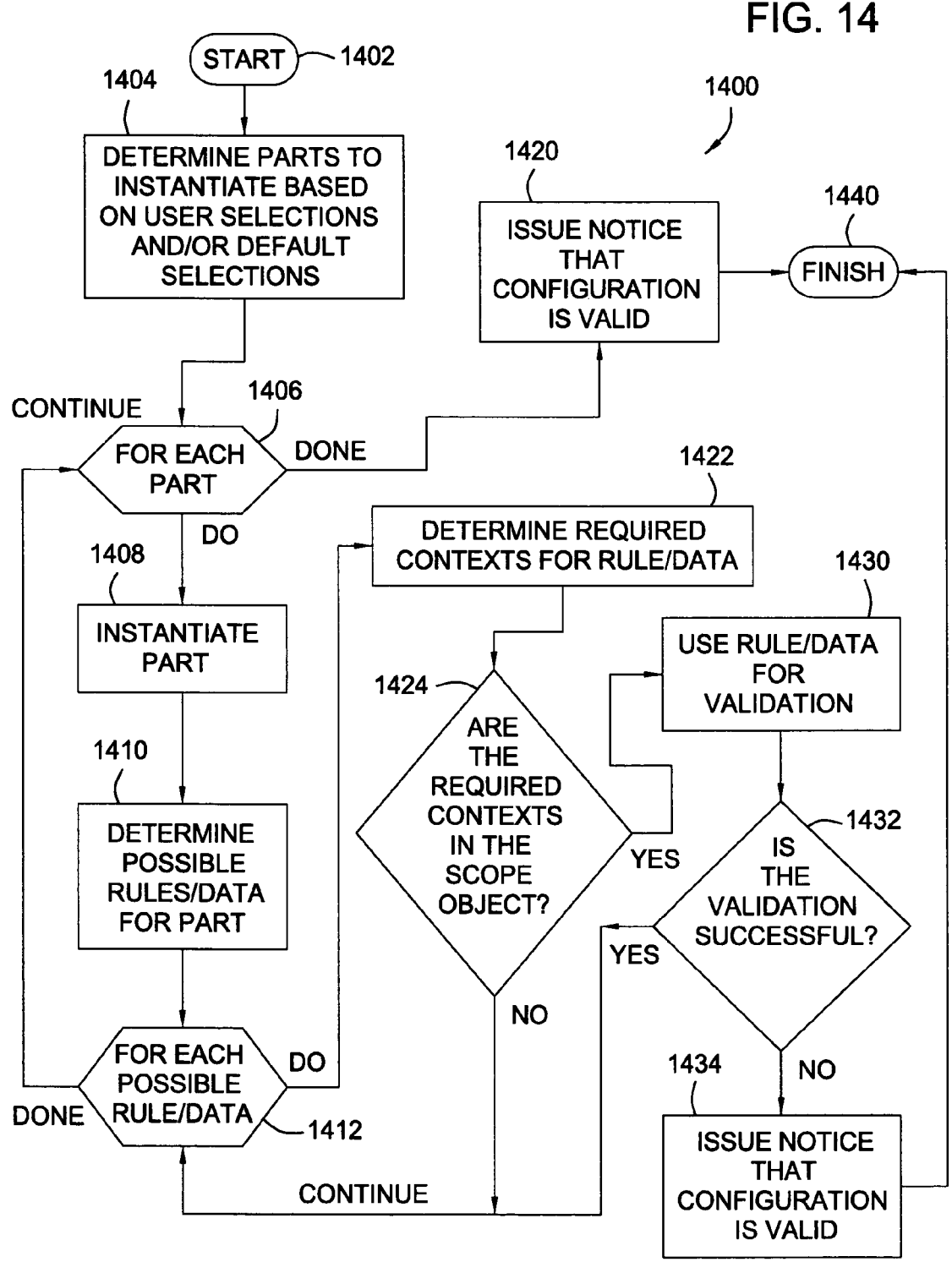
FIG. 14 is a flow diagram depicting a process for validating a user configured system according to one embodiment of the present invention.

When a validation request is received, the request may cause the validator 104 to validate the configured order 106. FIG. 14 is a flow diagram depicting a process 1400 for validating a user configured system according to one embodiment of the present invention. When the validation process 1400 begins, the validator 104 may receive the configured order 106 from the configuration tool 102. The process 1400 may be repeated every time the user requests a validation of the configured order 106.

The process 1400 may begin at step 1402 and continue to step 1404 where a determination of which parts to instantiate may be made based on user selections and/or default selections for the computer system being configured. Instantiating a part may refer to creating a software model of the part, initializing data for a part, or accessing data for a part. The software model of the part may be used in a model of the configured computer system to validate the system. The determination of which parts to instantiate may include determining the order of instantiation. For instance, significant base parts, such as a backplane, motherboard, or computer case may be instantiated first, and parts which connect to those base parts may be instantiated later.

Each instantiated part may not be explicitly requested by the user. For instance, a user may not have selected a PCI bridge or even know that one is necessary, but a PCI bridge may be instantiated during validation in order to validate the configuration. Also, some instantiated parts may be virtual parts or intermediate constructs. A virtual part may be a part that is not actually present in the configured system. For instance, the configuration tool 102 may be instantiated as a virtual part. Also, software interfaces, part numbers, process indicators for manufacturing, or price quotes for the product may be represented by a virtual part. An intermediate construct is an object which may be instantiated solely for the purpose of validation. As an example, a backplane, mentioned above, may be an intermediate construct. The backplane may not have a part number, but a hard disk selected by the user may need to be connected to a backplane, and the backplane may need to be connected to a disk controller. Accordingly, an intermediate construct for the backplane may be instantiated and used during validation.

After determining which parts to instantiate, the process 1400 of validating the configuration may continue at step 1406 where a loop is entered. The loop may continue for each part being instantiated. Thus, at step 1408 the part may be instantiated. Instantiating the part may include creating an object representing the part and initializing data about the part within the created object. Instantiating the part may also include giving the part access to the scope object 1100. Because each instantiated part may know to which system it belongs, and because there may be a one-to-one relationship between the scope object 1100 and the system being configured, every part in the system may have access to the scope object 1100. As described below, the contexts in the scope object 1100 may be used to determine which part rules and part data apply during validation of the configured system.

Figure 15:
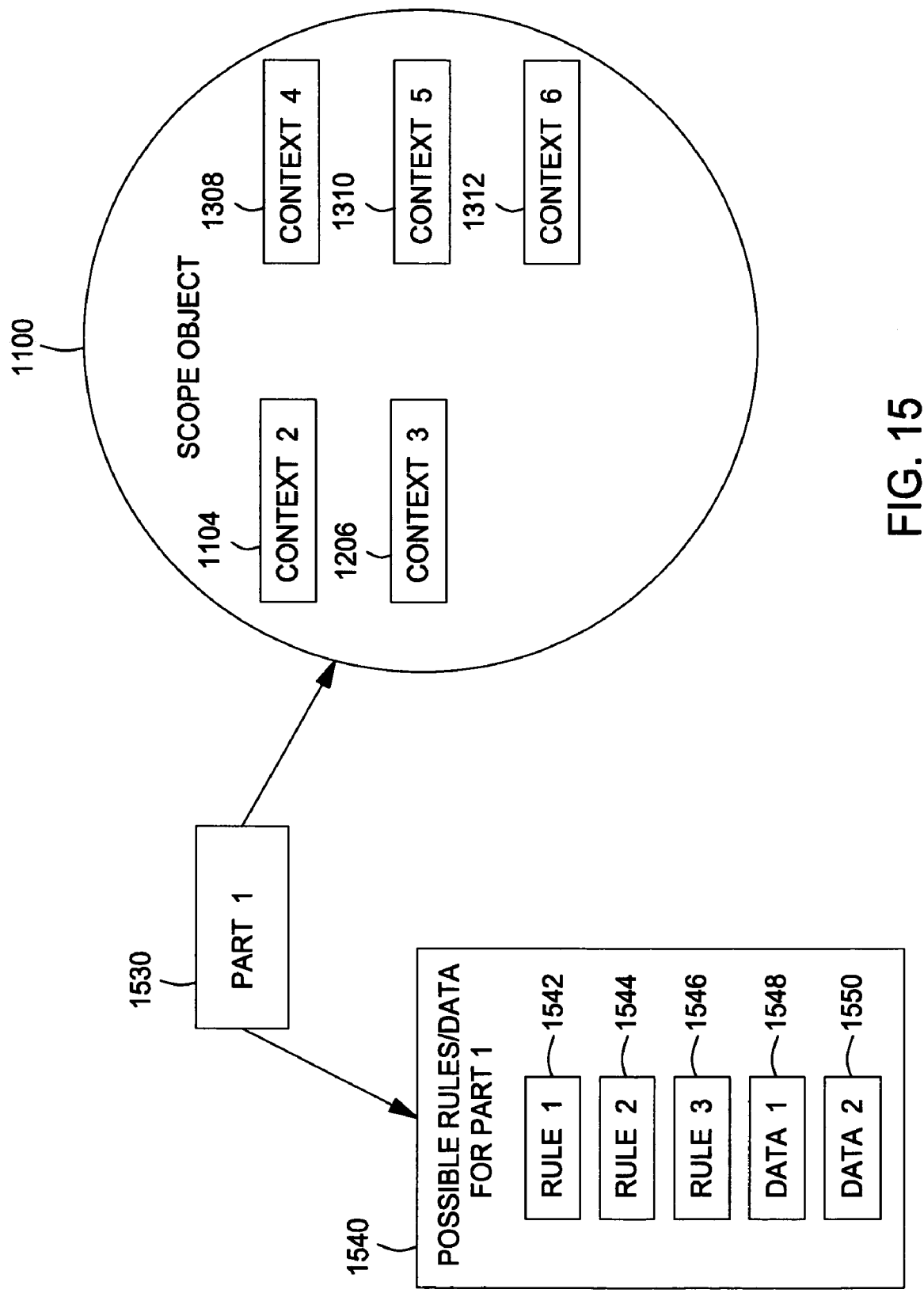
FIG. 15 is a block diagram depicting an instantiated part with access to the scope object and with possible part information which may apply to the part according to one embodiment of the present invention.

At step 1410 a determination may be made of the possible part rules and part data for the part (referred to collectively as part information). FIG. 15 is a block diagram depicting an instantiated part 1530 with access to the scope object 1100 and with possible part information 1540 (containing possible part rules 1542, 1544, 1546 and possible part data 1548, 1550) which may apply to the part 1530 according to one embodiment of the present invention. The possible part rules 1542, 1544, 1546 may include one or more rules defining tests for determining the validity of the configuration. The possible part data 1548, 1550 may define one or more necessary components for operation of the part. According to one embodiment, the possible part information 1540 may be stored in a software data structure, in a computer-readable specification document for the part (e.g., an XML document), or in any static data collection. Part information may also be stored as program code or methods for a part object contained, for instance, within a dynamically linked library.

After the possible part rules and part data have been determined, a loop may be entered at step 1412. The loop may be used to determine which of the possible part rules 1542, 1544, 1546 and part data 1548, 1550 for the part 1530 apply to the configuration being validated, and to use the applicable information in validating the configuration.

As described previously, which of the possible part information actually applies in a given configuration may depend on user selections made with respect to the configuration. Because the collection of contexts is modified by user selections, the applicable part information may depend on the contexts contained in the collection of contexts. In one embodiment of the invention, application rules, shown in Table 2 and described below, may be used with possible the part rules and part data of a part (e.g., the first part 1530) to determine whether the rules and data for that part apply to a configuration.

TABLE 2

Application Rules for Part Information

| Part 1 Information | Contextual Rules for Applying Part Information |
|---|---|
| Rule 1 | Context 2 |
| Rule 2 | Context 1 and Context 2 |
| Rule 3 | (Always Apply) |
| Data 1 | Context 2 and not Context 3 |
| Data 2 | Context 5 or Context 9 |

Figure 16:
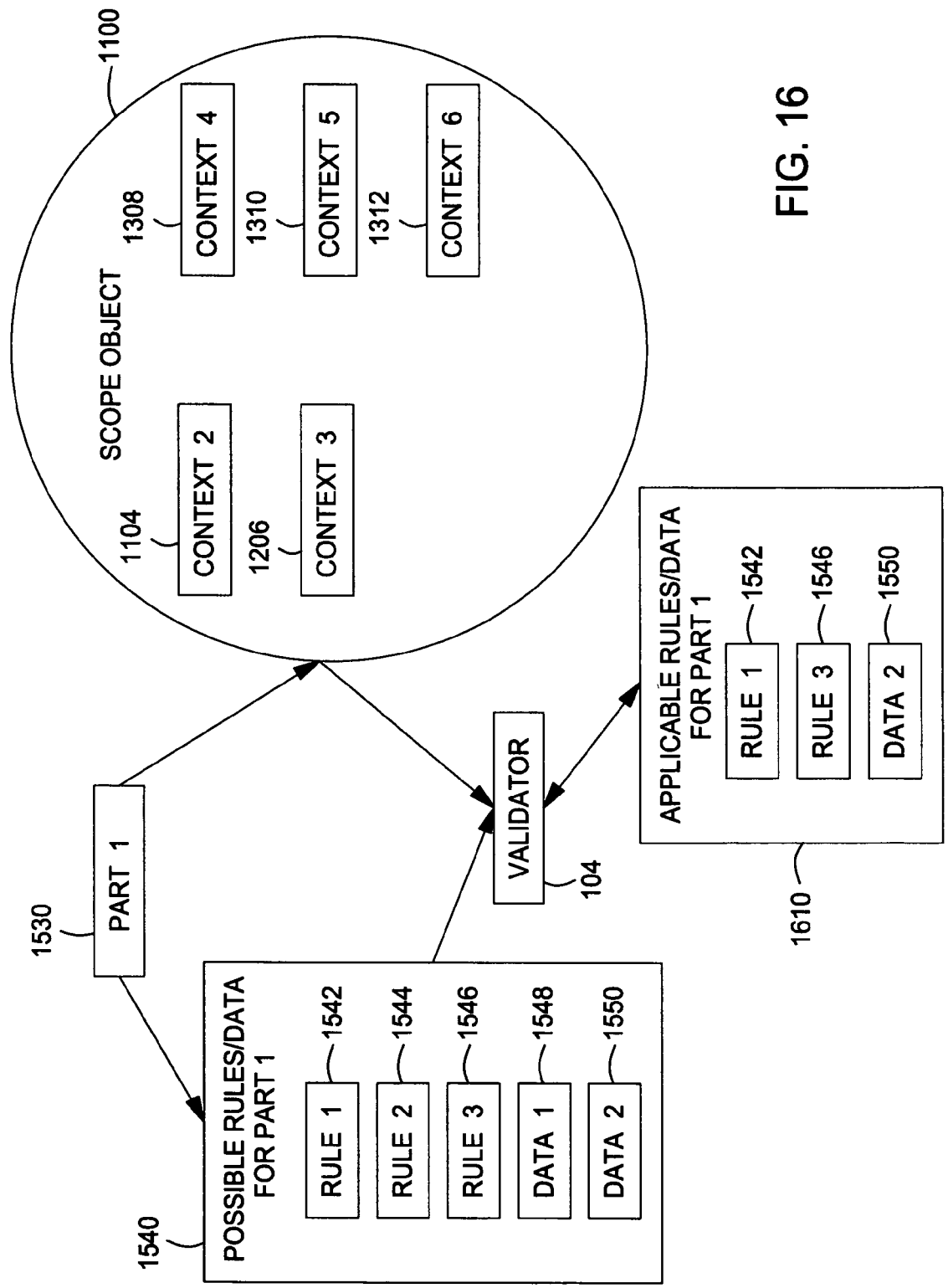
FIG. 16 is a block diagram depicting a validator for determining the applicable part information for a part using the scope object.

The application rules for the part information may be stored in a data structure within the part, in a data structure within the validator 104, in a specification document for the part, within the part information, or in any other place known to those skilled in the art. According to one embodiment of the invention, the validator 104 may apply the application rules to the scope object 1100 to determine the applicable rules and data for a part. FIG. 16 is a block diagram depicting the use of the validator to determine the applicable part information 1610 for a part using the scope object 1100.

When determining whether to apply part rules or part data, the validator 104 may need to understand which contexts are required for a given rule or data to apply. Thus, at step 1422 a determination may be made of the required contexts for the part rule or part data. The determination of which contexts are required may be made by examining the application rules (shown in Table 2). For instance, the application rules for Rule 1 of Part 1 show that Context 2 is required for Rule 1 to apply. The application rules may also contain complex Boolean expressions which may be used to determine whether a set of contexts is required for a given rule. As an example, for Data 2, the second data 1550 may be applicable if either Context 5 or Context 9 is present in the collection of contexts (thus, Context 5 or Context 9 is required when determining if Data 2 should be used for validation).

Once the required contexts for a given part rule or part data are determined at step 1422, a determination may be made at step 1424 of whether the required contexts are in the scope object. For instance, with respect to FIG. 16 and Rule 1, the validator may determine if the required context (Context 2) is in the scope object 1100. Because the required second context 1104 is in the scope object, the first rule 1542 may be included in the collection of applicable part information 1610. Thus, the applicable part information 1610 may be considered to be possible part information filtered by the contexts in the scope object 1100.

If a required context for part information is not in the scope object 1100, that part information may not be applicable in validating the part. For instance, with respect to Rule 2, the required contexts are Context 1 and Context 2. Because Context 1 is not in the scope object 1100, Rule 2 is not applicable part information 1610. If the required contexts are not within the scope object, the steps 1422, 1424 for determining which part information is applicable may be continued without using the inapplicable part information for validation.

Other variations of application rules may be similarly applied. Some rules may always apply. Thus, with respect to Rule 3, no applicable context may be required and the rule may always be included in the applicable part information 1610. With respect to Data 1, the application rules may specify that the first data 1548 is applicable when the second context 1104 but not the third context 1206 is present in the scope object 1100. Thus, because the third context 1206 is in the scope object 1100, the first data 1548 may not be included in the applicable part information 1610. Finally, because the fifth context 1310 is in the scope object 1100, the second data 1550 may be included in the applicable part information 1610.

According to one embodiment of the invention, determining whether a required context is in the scope object 1100 may include determining whether the required context is included as a hierarchical context in the scope object 1100. A hierarchical context is a group of contexts which are hierarchically related. As an example, a hierarchical context may represent a version number, release number, and modification number of an operating system selection. For instance, the user-selected operating system may be AIX 4.3.2 (where 4 may represent a version number, 3 may represent a release number, and 2 may represent a modification number). Thus, a context may be included in the scope object 1100 for AIX 4.3.2. The context for AIX 4.3.2 may be a hierarchical context because the AIX 4.3.2 context may include a context for AIX 4.3, a context for AIX 4 and a context for AIX. A given part rule may apply whenever the operating system is AIX 4.3, regardless of the modification number. Accordingly, any hierarchical context derived from an AIX 4.3 context (e.g., AIX 4.3.0, AIX 4.3.1, AIX 4.3.2, AIX 4.3.3, etc.) will satisfy the required context for the part rule and cause the part rule to be used in validating the configuration.

While hierarchical contexts may be used in the scope object 1100, in one embodiment of the invention, the contexts in the scope object 1100 are not hierarchically related to each other. For example, the contexts may have non-overlapping (or independent) hierarchies. An example of non-overlapping hierarchical contexts may include a context for AIX 4.3.0 (an operating system) and a context for Lotus Notes 6.5 (e-mail client software). The concept of multiple non-overlapping hierarchical contexts in a single scope object is consistent with the embodiment described above wherein any type of context may be placed in a scope object with any other type of unrelated context.

In any case, if the required contexts for a part rule or part data are in the scope object 1100, the part rule or part data may be used at step 1430 for validation. With respect to a part rule, the part rule may be applied to test the validity of the selected configuration. For instance, as described above, a part rule for server software may be used to determine whether the server software is compatible with the selected operating system. With respect to part information, the part information may be used to instantiate necessary components for operation of the part. For instance, if a hard disk requires a power adaptor when a certain power supply is present in the configuration, the part information for the hard disk may be used to instantiate the power adaptor for the hard disk. The instantiated adaptor may also be validated as well using part rules and part data for the adaptor. If a given adaptor is not compatible with the configuration (e.g., if it is invalid), the part information may provide optional adaptors.

After the part information has been used for validation at step 1430, a determination may be made at step 1432 of whether the validation was successful. If validation with respect to the applicable part rule or part data is unsuccessful, a notice may be issued at step 1434 that the selected configuration is invalid. Issuing the invalidity notice may include, for instance, providing feedback 114 from the validator 104 to the user interface 112 which informs the user that the configured system is invalid. The notice may also contain information informing the user of the reasons for the invalidity and suggesting possible selection changes which may result in a valid configuration. After issuing the notice that the configuration is invalid, the process may finish at step 1440. According to another embodiment of the invention, if a selected part in the configuration is invalid, the part may be removed from the configuration, the validation may continue, and the user may be allowed to purchase the system without the invalid part.

Figure 17:
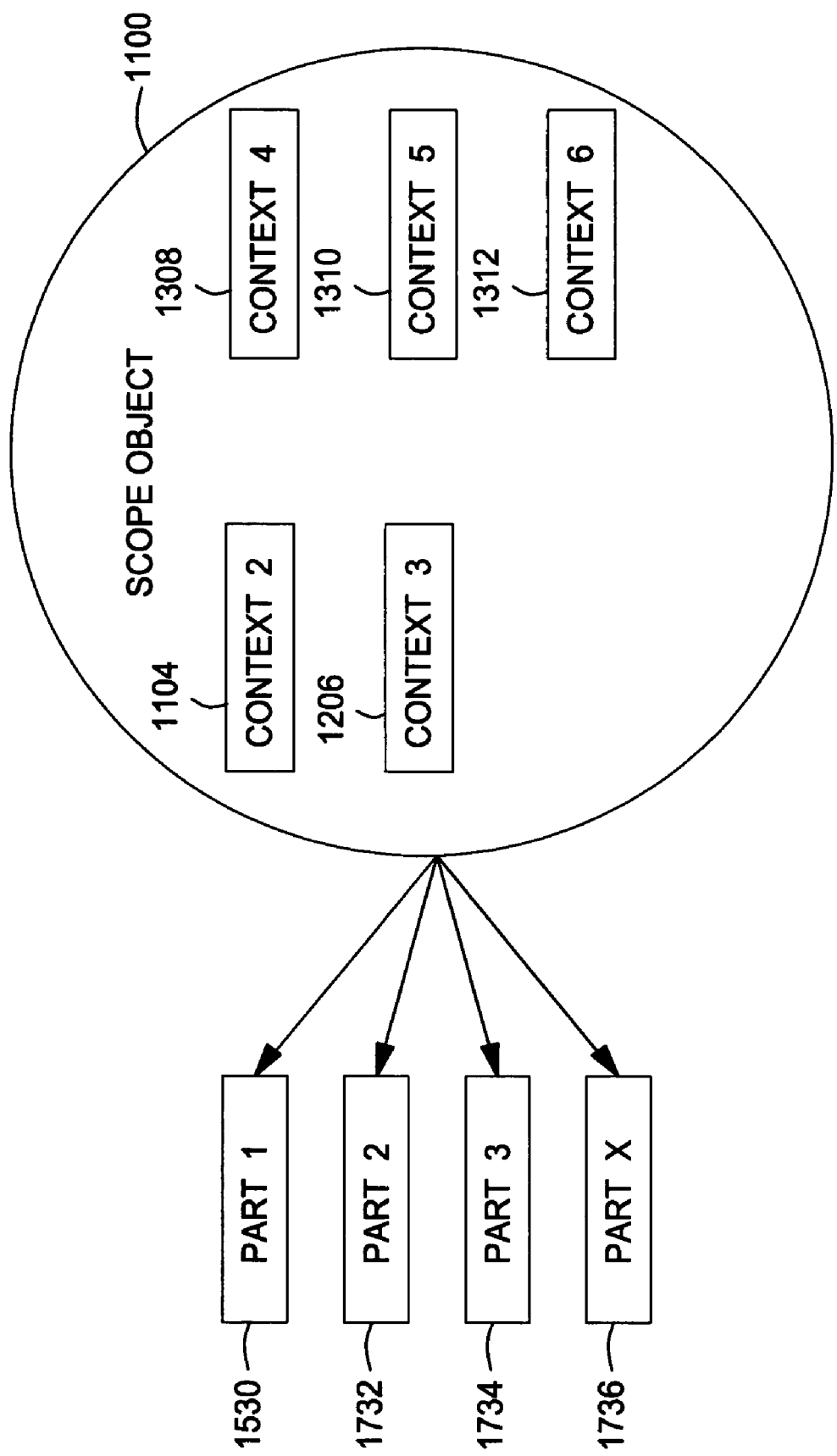
FIG. 17 is a block diagram depicting multiple instantiated parts with access to the scope object.

If, instead, the validation using the applicable part information is successful, the steps 1422, 1424 for determining which other part information is applicable may be continued. After all of the part information for a part has been examined and used for validation, the validation process may be continued for each remaining part in the configured system, until every part has been validated or until an invalid part is found. As described above, each new instantiated part may be given access to the scope object and may use the contexts in the scope object to determine which part information to apply during validation. FIG. 17 is a block diagram depicting multiple instantiated parts 1530, 1732, 1734, 1736 with access to the scope object 1100. If every part 1530, 1732, 1734, 1736 is validated, a notice that the configuration is valid may be issued at step 1420 and the process 1400 may finish at step 1440.

Extending the Abilities of the Configuration System

In addition to simplifying the process of determining what part information applies during the validation of a configured system, the described embodiments of the configuration system may be flexible and generic such that the abilities of the configuration system with respect to validating new types of parts may be easily extended. Each time a new part is added, the configuration system may not need to be rewritten to account for the new part rules or new part data. For instance, adding the new part may only require that new selections be added to the user interface 112, that new context selection rules (such as those depicted in Table 1) be added for the new selections, and that contextual application rules (such as those depicted in Table 2) be added for the new part information. Because extending the capabilities of the configuration system may only require addition of new data to the configuration system and may not require extensive, custom coding within the configuration system, the configuration system may be described as data-driven.

In one embodiment of the invention, contexts in the collection of contexts may be used for additional purposes other than determining applicable part information during validation. As an example, the contexts may be used to filter information displayed to the user through the user interface 112 while the user navigates the user interface 112 and makes selections. For instance, when the user selects an operating system, the contexts in the collection of contexts may be used to offer optional software for that operating system to the user through the user interface 112.

While embodiments above are described with respect to certain rules and data (e.g., rules used to modify contexts, rules used to determine applicable part information, part rules, or part data), the described rules and data and the described arrangements thereof are meant to be descriptive of the described embodiments and not limiting. Other embodiments are contemplated. For instance, in one embodiment, contexts in the collection of contexts may be modified without context selection rules, e.g., using hidden tags within the user interface to add or remove contexts based on a user selection. Other such embodiments should be readily apparent to those of ordinary skill in the art.

While the foregoing is directed to embodiments of the present invention, other and further embodiments of the invention may be devised without departing from the basic scope thereof, and the scope thereof is determined by the claims that follow.

What is claimed is:

1. A method for validating a user configuration of a computer system being configured with a configuration system, the method comprising:
   receiving, through a user interface of the configuration system, a user configuration selection, wherein the user configuration selection modifies the configuration of the computer system;
   based on the user configuration selection, modifying one or more contexts in a collection of contexts, wherein each modified context represents a condition of the configuration of the computer system which is related to the user selection;
   applying the collection of contexts to part information for a part of the computer system to determine applicable part information for the modified configuration, wherein the part information comprises at least one of part data and part rules, wherein the part rules comprises one or more rules defining tests for determining the validity of the configuration and wherein the part data defines one or more necessary components for operation of the part;

determining whether the configuration is valid based on the collection of contexts and the part information; and if the configuration is invalid, presenting an error message to the user, wherein:
   the error message specifies:
      the configuration is invalid; and
      at least one of the reasons that the configuration is invalid; and
   the error message comprises a suggested replacement message, comprising one or more suggested replacement parts; and
   a subsequent user configuration selection may modify the configuration such that the configuration is valid.

2. The method of claim 1, wherein modifying the configuration comprises adding a new part to the computer system, and wherein modifying the collection of contexts comprises adding the context to the collection of contexts.

3. The method of claim 2, wherein the user configuration selection maps to the added context, wherein a subsequent user configuration selection maps to the same added context, and wherein subsequently removing the user configuration selection does not remove the added context from the collection of contexts.

4. The method of claim 1, wherein modifying the configuration comprises removing a part from the computer system, and wherein modifying the collection of contexts comprises removing the context from the collection of contexts.

5. The method of claim 1, wherein the context is a hierarchical context, wherein the collection of contexts contains one or more other hierarchical contexts, and wherein the hierarchical context and the one or more other hierarchical contexts have non-overlapping hierarchies.

6. The method of claim 1, wherein:

the error message further comprises one or more suggested replacement parts; and the subsequent user configuration selection may modify the configuration to replace the part with at least one of the suggested replacement parts such that the configuration is valid.

7. The method of claim 1, wherein:

the error message further comprises one or more suggested replacement contexts; and the subsequent user configuration selection may modify the configuration to replace at least one context of the collection of contexts with at least one of the suggested replacement contexts such that the configuration is valid.

* * * * *